United States Patent [19]
Han

[11] Patent Number: 5,843,256
[45] Date of Patent: Dec. 1, 1998

[54] METHOD OF MAKING CLEANING PADS

[76] Inventor: In-Yong Han, Room 605 Woo Sung Apt. 108-132, Hagae-Dong, Nowon-Ku, Seoul, Rep. of Korea

[21] Appl. No.: 856,446

[22] Filed: May 14, 1997

[51] Int. Cl.$^6$ .................................................. B32B 31/16
[52] U.S. Cl. ......................... 156/73.1; 156/269; 156/290; 156/308.4; 15/244.3
[58] Field of Search ................................. 156/73.1, 269, 156/288, 290, 308.2, 308.4, 324, 580.1, 580.2; 15/229.11, 244.3

[56] References Cited

U.S. PATENT DOCUMENTS

| | | | |
|---|---|---|---|
| 4,052,238 | 10/1977 | Botvin | 156/148 |
| 4,168,863 | 9/1979 | Hatcher | 156/191 X |
| 4,287,633 | 9/1981 | Gropper | 15/209 B |
| 5,441,333 | 8/1995 | Kim | 300/21 |

*Primary Examiner*—James Sells
*Attorney, Agent, or Firm*—John K. Park; Law Offices of John K. Park & Associates

[57] ABSTRACT

The present invention is a method of making cleaning pads by taking an already made continuous mesh tube or knitting a continuous mesh tube, and inserting a continuous absorbent element material into the mesh tube. Then, feeding the continuous mesh tube with the continuous absorbent element into a compressing and ultra-sonic sealing apparatus, and compressing the continuous mesh tube and the continuous absorbent element within the continuous mesh tube together. Then, sealing the compressed continuous mesh tube along with the compressed continuous absorbent element with a ultra-sonic sealing apparatus, and cutting the compressed and sealed continuous mesh tube and the compressed continuous absorbent element thereby forming one or more cleaning pads.

19 Claims, 4 Drawing Sheets

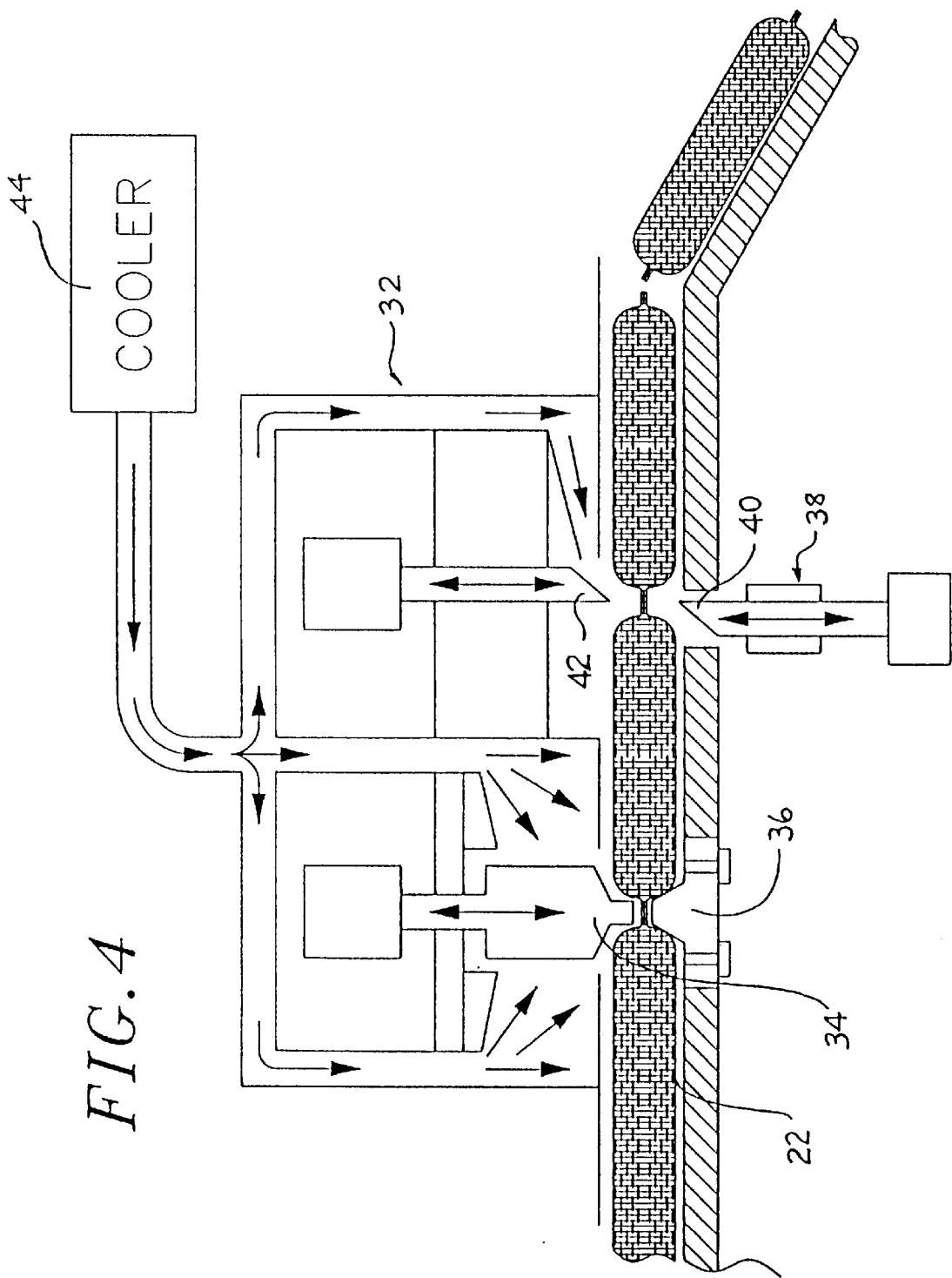

METHOD OF MAKING CLEANING PADS

BACKGROUND

This invention relates to a new and innovative method of making cleaning pads which are good for cleaning, smoothing and finishing various articles.

Abrasive cleaning pads utilizing soft absorbent core with abrasive material surrounding the core are commonly used as cleaning agents. The pads are used as a cleaning aid, smoothing or finishing device, or as scouring device depending of the different weave and material of the abrasive outer shell and inner foam core. The device is commonly known as a scouring or a cleaning pads.

The typical cleaning pads are manufactured by making the outer shell of abrasive fiber knitted into the shape of a pouch, and then inserting a soft, absorbent foam core material, typically made of sponge. As currently manufactured, the ends of the pouch are finished either individually by stitching or by heat sealing.

One of the current manufacturing processes of individual stitching requires time consuming manual labor. The end products of this method also sacrifice efficiency and durability because the cover pouch is not melded together with the core material. The sponge core may shift and bunch up inside the outer shell during the scouring action while using the pad. The shifting and bunching of the core causes excessive local wear of the outer shell and prevents full usage of the outer surface.

Another method currently available involves inserting a continuous soft foam core into a long tubular outer shell of abrasive material and heat-pressing to terminate the ends. This manufacturing method, while makes it possible to manufacture the cleaning pads in an automated process, produces cleaning pads that are not completely free of problems. The cleaning pads produced through the heat-pressing method have integrated inner foam core and outer abrasive shell as the ends of the core and shell are melted together in the pressing and cutting process. The melted ends form hard, inflexible and solid surface. The hard ends formed in the heat-pressing have different density and surface from the original materials and are subject to breakage and opening when the pad is twisted or bent laterally.

The heat-pressing method, thus, sacrifice durability of the product while improving production efficiency and uniform performance of the cleaning pad. The heat-pressing method, as it involve melting the abrasive outer shell, together with the foam core, produces smoke and odor and involves other production hazard such as hot iron. This method is limited in its capacity and speed as the melting of the material takes required amount of time before one edge is joined and ready to be cut.

Therefore, there is a need for a manufacturing process of cleaning pads that not only is efficient, automated and speedy, but also produces cleaning pads with finished ends that are not brittle or otherwise, subject to breakage during usage.

SUMMARY

The present invention is directed to a new and innovative method of manufacturing foam core pads with abrasive mesh outer shell, commonly known as scouring pads or cleaning pads.

This new method utilizes an automated mass-production process of the pads, utilizing pre-fabricated or knitting a continuous abrasive mesh tube as the outer shell, inserting continuous foam core material (otherwise referred to as continuous absorbent element) into the mesh tube, compressing the combined inner and outer materials, and sealing together the ends, while ends are compressed together, by applying various frequencies of ultra-sonic waves to the compressed ends.

The present invention produces pads of improved quality from the pads manufactured through currently known methods while retaining the flexibility and the durability of the finished edges of the individually stitched pads without the time-consuming and expensive process of individually stitching the pads.

The present invention is a method of making cleaning pads by taking an already made continuous mesh tube or knitting a continuous mesh tube, and inserting a continuous absorbent foam core material into the mesh tube. Then, feeding the continuous mesh with the continuous absorbent element into the apparatus consisting of a compressor, a ultra-sonic-operated sealer to compress and to seal the continuous mesh tube at predetermined lengths. Then, using a cutter to cut the continuous mesh with the absorbent material where the compression and sealing have taken place.

The production-ready continuous abrasive mesh tubes with continuous absorbent elements in them may be fed without intermission as the compressing and fusing are done in a short period of time. Therefore, the invention allows an automated mass-production method of the manufacture of cleaning pads.

The present invention improves the pads produced by individually stitching as the two outer edges of the foam core are sealed between the outer edges of the outer shell by compressing and bonding the ends by applying ultra-sonic waves. The edges produced through this method are uniform and retain flexibility of the original material unlike those compressed and burned-in through heat-pressing method.

This new automated method further improves the production efficiency and other considerations from the currently known production processes such as heat-pressing method, because it involves little smoke, odor, heat or other safety problems in the prior continuous production methods. The new method also makes it possible to have an objective uniform results in different batches of production as the process allows the manufacturer to preprogram the exact amount, frequency and duration of the ultra-sonic waves to be applied in the compressing and bonding process.

BRIEF DESCRIPTION OF THE DRAWINGS

FIG. 4 is a diagrammatic view illustrating the preferred method of manufacture of the cleaning pads of FIG. 1.

DETAIL DESCRIPTION

Figure 1:
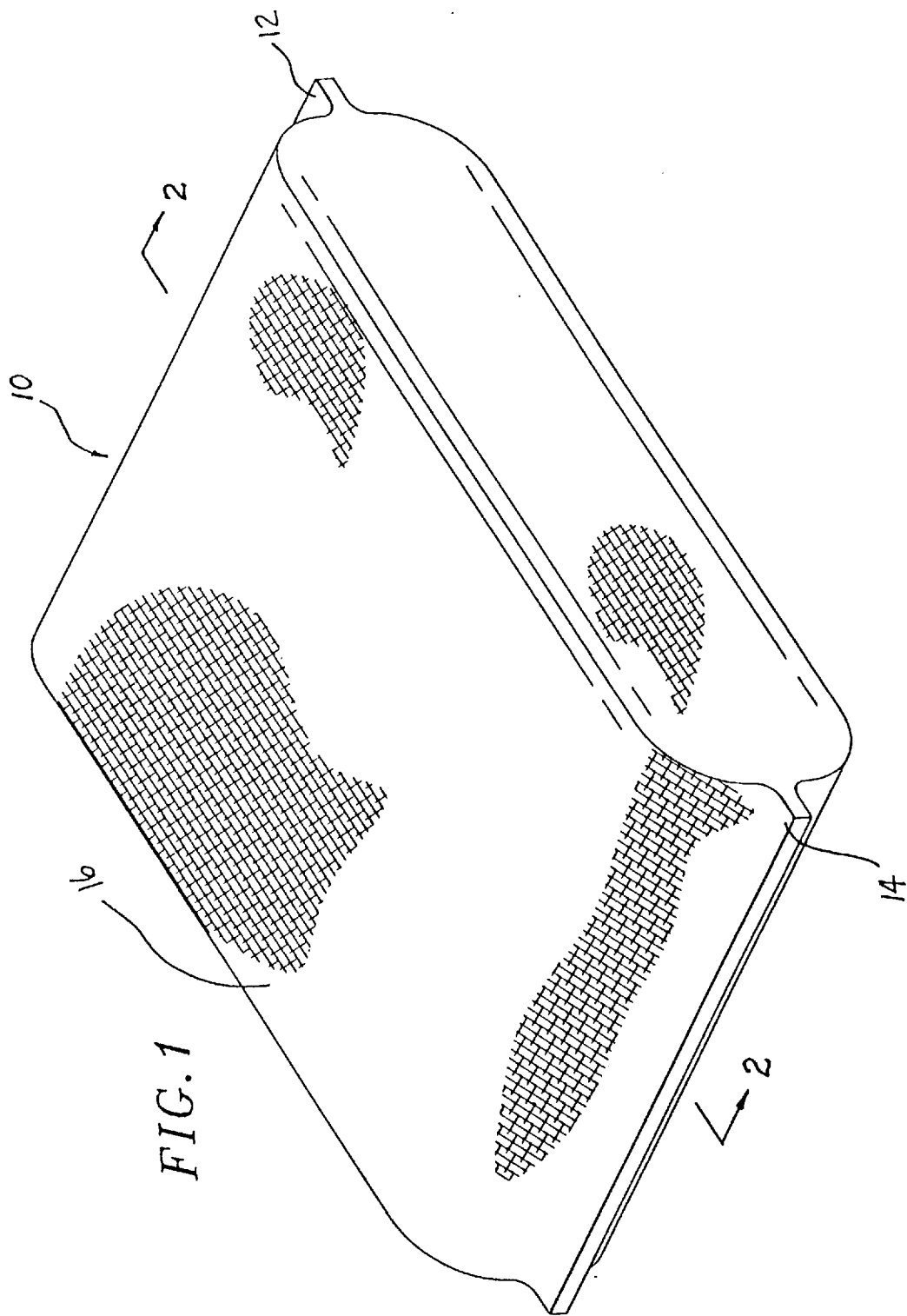
FIG. 1 is a perspective view of a cleaning pad of this invention.

Referring to the drawings, FIG. 1 illustrates an improved cleaning pad 10 made from the present instant invention. The cleaning pad 10 is sealed on two ends 12, 14 using the ultra-sonic sealing method.

The outer shell 16 of the improved cleaning pad is knitted mesh constructed from various material including Nylon, Mylar, polyester, aluminum, metal fibers or combinations thereof. The outer shell 16 of the improved cleaning pad 10 is flexible and abrasive to suit the task of scouring, cleaning and polishing the surfaces.

Figure 2:
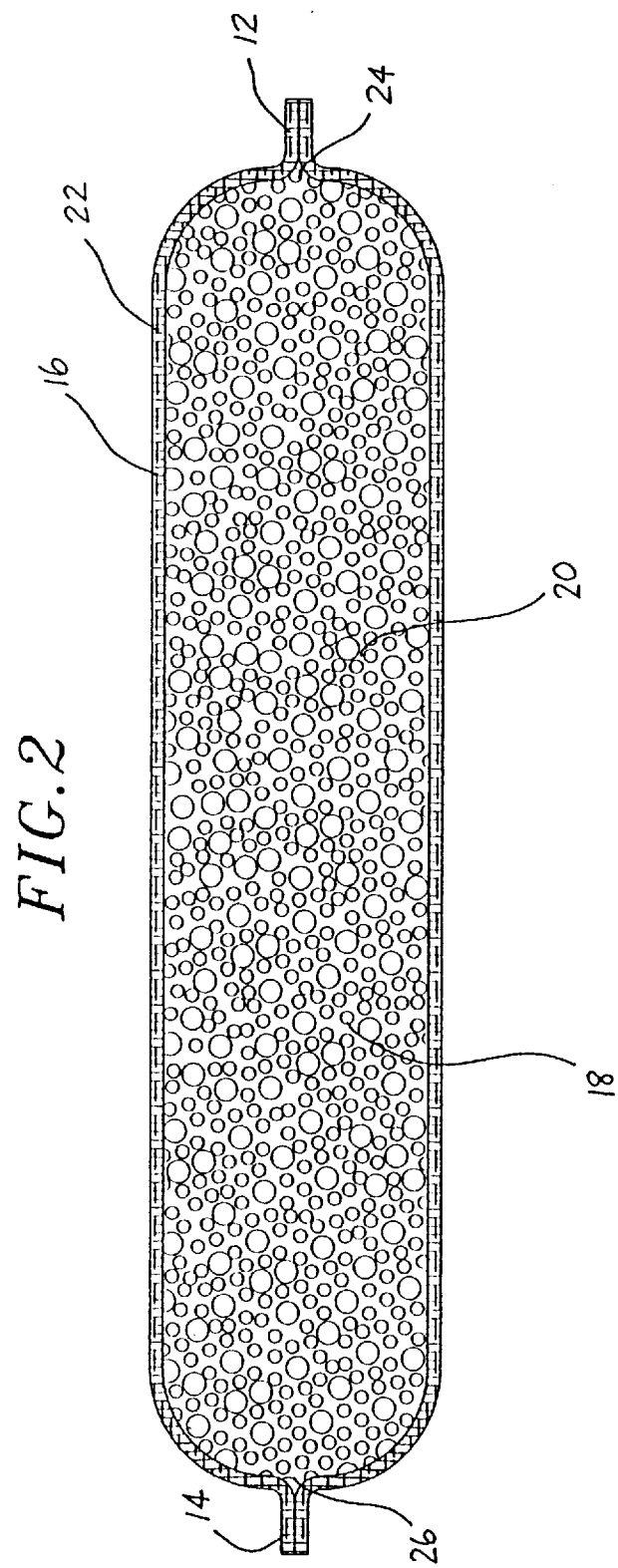
FIG. 2 is a cross sectional view of FIG. 1 across the plane A—A thereof showing the continuous absorbent element surrounded by the continuous abrasive mesh tube.

FIG. 2 illustrates a cross sectional view of FIG. 1 across the plane A—A thereof showing a cut portion of a continuous absorbent element 18, forming an absorbent core 20, tightly embraced by the cut portion of the continuous abrasive mesh tube 22.

The absorbent core 20 may be flexible, porous and absorbent sponge of various natural and synthetic materials such as polyurethane. The sponge makes close contact of the abrasive outer shell 16 possible when applied to various surfaces to perform the cleaning and polishing tasks while absorbing and retaining liquid and detergent within the porous structure of the core material.

FIG. 2 also illustrates one of the benefits of this invention method in that both ends of the absorbent core 24, 26 are tightly pinched and melded together with the ends of the outer shell 12, 14, fixing the position of the absorbent core 20 within the cleaning pad 10. Because the absorbent core 20 is held fixed by the two ends of the cleaning pad 12, 14, the cleaning pad 10 will have a longer life as the entirety of the cleaning pad 10 now may be used evenly; reducing the localized wear and tear.

The present invention is a method of making cleaning pads 10 by taking an already made continuous mesh tube 22 or knitting a continuous mesh tube 22, and inserting a continuous absorbent element 18 material into the mesh tube 22. Then, feeding the continuous mesh tube 22 with the continuous absorbent element 18 into a compressing and ultra-sonic sealing apparatus, and compressing the continuous mesh tube 22 and the continuous absorbent element 18 within the continuous mesh tube 22 together. Then, sealing the compressed continuous mesh tube 22 along with the compressed continuous absorbent element 18 with an ultra-sonic sealing apparatus, and cutting the compressed and sealed continuous mesh tube 22 and the compressed continuous absorbent element 18 thereby forming one or more cleaning pads 10.

Figure 3:
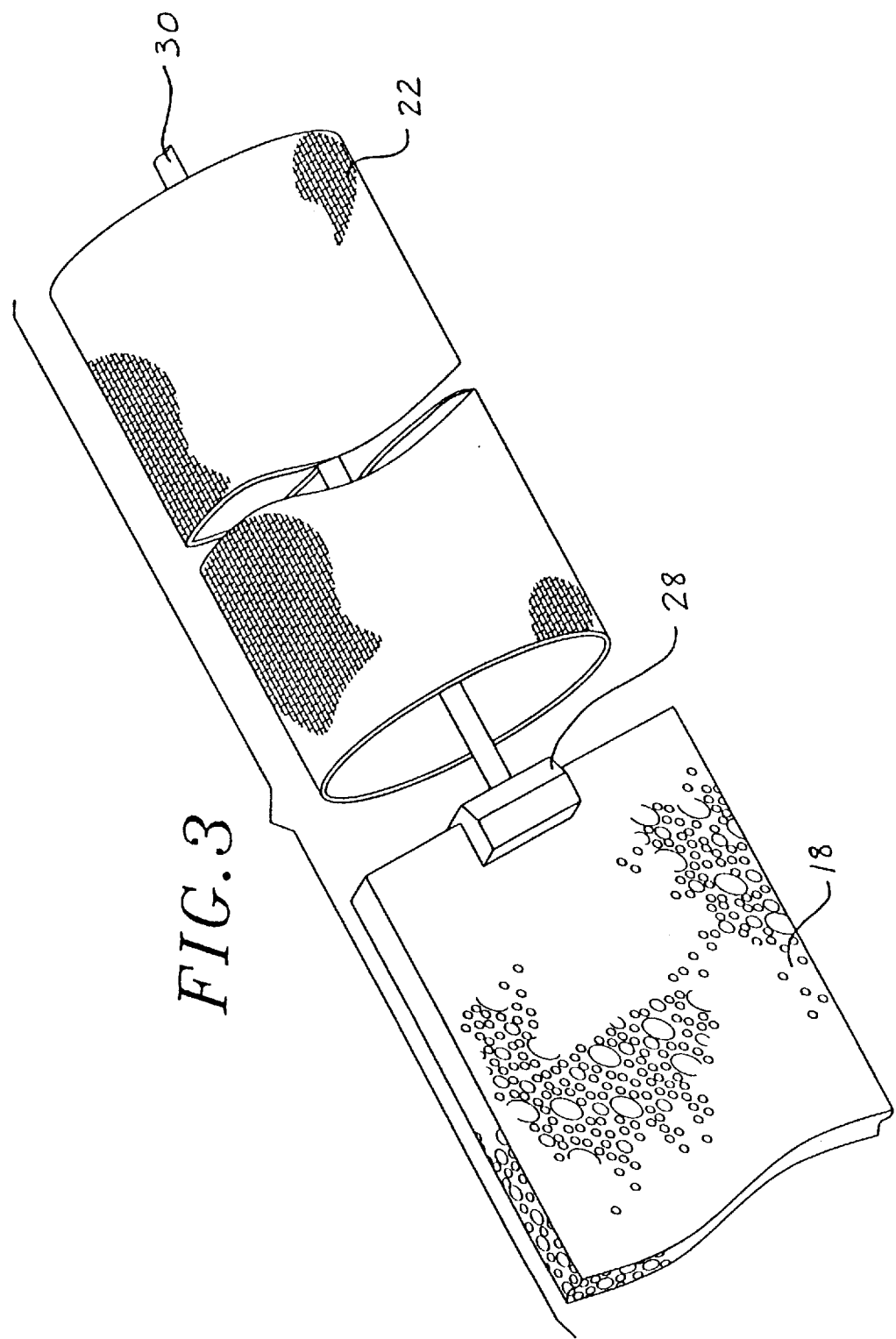
FIG. 3 is a perspective view of a continuous absorbent element being inserted into a continuous abrasive mesh tube.

FIG. 3 illustrates a preferred method of inserting a continues absorbent element 18 with a plurality of surfaces into a continuous abrasive mesh tube 22 so that the continuous mesh tube 22 wraps around the surfaces of the continues absorbent element 18. A clamp 28 with a long extension 30 is used to grab an end of the continuous absorbent element 18 to pull the entire length of the continuous absorbent element 18 into the length of the continuous abrasive mesh tube 22.

One of the benefits of this invention method is that the heat generated in using the ultra-sonic sealing apparatus is low. Therefore, this process controls the overheating problem in extended period of continuous production well, and the length of the continuous abrasive mesh tube or a continuous absorbent element are not limited in overall length.

FIG. 4 illustrates the use of the compressing and ultra-sonic sealing apparatus 32 to manufacture cleaning pads 10. In this configuration of the compressing and ultra-sonic sealing apparatus 32, the preferred version of the invention wherein the step of compressing and the step of sealing are done simultaneously. Although FIG. 4 does not show, the step of compressing may be done before the step of sealing, by the compressing and ultra-sonic sealing apparatus 32 having separate devices to compress and to seal.

The compressing and ultra-sonic sealing apparatus 32 as shown in FIG. 4 has two elements. The first element is a combination of a ultra-sonic wave generator 34 and a compressing unit 36. Because the continuous abrasive mesh tube 22 with the continuous absorbent element 18 are both made of soft material, a part of the ultra-sonic wave generator 34 may be used as a part of the compressing unit 36. However, in situations where the ultra-sonic wave generator 34 is delicate so that it may not be used as a part of the compressing unit 36, a sleeve or a protective shield may be added to the ultra-sonic wave generator 34. The added benefit of having the ultra-sonic wave generator 34 and the compressing unit 36 be one element is that the step of compressing and the step of sealing may be done simultaneously.

The second element is a cutting element 38. The cutting element 38 may comprise of two cutting edges 40, 42 located in pre-set distance from the ultra-sonic wave generator 34 so that the pre-set distance is equal to the length of a cleaning pad 10. When the pre-set distance is equal to one or multiple lengths of the length of a cleaning pad 10, then the step of cutting may be done simultaneously with the step of compressing or the step of sealing.

The cutting element 38 can be operated in spring actions through magnetic, motorized or other mechanical propelling actions and are not limited in speed as the blades are not heated nor electrified. An optional cutting element may be other means for cutting such as laser technology. The use of laser cutting means may make the cut surface free of rough edges or into special design custom shaped edges.

Because the continuous abrasive mesh tube 22 and the continuous absorbent element 18 are used, when the compressing unit 36 compresses and the ultra-sonic wave generator 34 seals the sealed end, all three layers of then existing materials, two layers of the continuous abrasive mesh tube 22 and a layer of the continuous absorbent element 18, are melded and bonded together to give a secure seal. The result is that the absorbent core 20 is held fixed by the two layers of the abrasive mesh tube 22, and the absorbent core 20 will not bunch up creating a lump. Therefore, the localized wear and tear of the cleaning pad 10 may be reduced, and the cleaning pad 10 will have a longer life as the entirety of the cleaning pad 10 now may be used evenly.

The seal generated by the ultra-sonic sealing apparatus takes a short duration, generally about two to three seconds, making the production effortless and quick, enabling a mass production of cleaning pads 10. This is especially true when more than one continuous abrasive mesh tube 22 with the continuous absorbent element 18 are being parallelly sent through the compressing and ultra-sonic sealing apparatus 32 simultaneously.

Moreover, because the performance of the equipment can be controlled well, even a true automation of the process may be achieved, and each of the different batches of production will retain uniform quality of production. Furthermore, the sealed end is nearly odor free, heat and smoke free. Furthermore the bonded edges retain the characteristics of the original material as opposed to heat pressed edges, which form hard and inflexible burnt substance of altogether different characteristics from the original material, causing breakage and tearing in the cleaning and scouring usage of the finished cleaning pads 10.

The ultra-sonic wave frequency used in the process, generated by the ultra-sonic wave generator 34, should be less than about 25 kilo-hertz. The inventor believes that the most preferred ultra-sonic wave frequency is about 15 kilo-hertz. However, some countries restrict the use of ultra-sonic wave frequency band lower than about 20 kilohertz. Therefore, in such countries, including the United States, about 20 kilo-hertz should be used.

An improvement to the above described invention may be made by adding a step of ejecting the cleaning pads 10 after the compressed and sealed cleaning pad 10 exits the compressing and ultra-sonic sealing apparatus 32. An example of a simple, yet automatic, means for ejecting the cleaning pads 10 after the cutting is illustrated in FIG. 4. With this step of ejecting the cleaning pads 10, the products made of this invention can be cut, ejected, and stored automatically.

FIG. 4 also illustrates the use of a cooler 44 to provide a step of cooling the compressing and ultra-sonic sealing apparatus 32 so that even the little heat that may be generated in the use of the ultra-sonic wave generator 34 may be removed to better control the entire operation to give a better controlled environment. As more control is obtained in the process, the entire operation may be made of a better automation, and the final products more uniform.

Although it is not illustrated in FIG. 4, an additional improvement may be made by adding a step of sensing the movement of the continuos abrasive mesh tube 22 into the compressing and ultra-sonic sealing apparatus 32 for a predetermined distance. With the step of sensing the movement, each of the cleaning pads 10 will be of a uniform size.

This method of fabrication of cleaning pads allow production of pads of various material at the efficiency and speed formerly unattainable. The innovative method also allows production of pads 10 that incorporate more firm and durable edges than were possible before this invention.

Thus, a method for fabricating cleaning pads 10 is disclosed which is capable of producing mass quantity of pads continuously and in automated fashion. The embodiments and applications of this invention have been shown and described applying current obtainable state of the arts. However, it should be evident to the skilled artisans of the trade that variations and minor changes in the method of production involving the production of the cleaning pads 10 of this invention may be resorted to without departing from the spirit of the invention and the scope of the appended claims.

Although the present invention has been described in considerable detail with reference to certain preferred versions thereof, other versions are possible—For example the cleaning pad 10 may also be compressed and sealed about the middle of the cleaning pad 10 to affix the absorbent core 20 more securely to the outer shell 16.

What I claim is:

1. A method of making cleaning pads comprising the steps of:
   a) inserting a continuous absorbent element with a plurality of surfaces into a continuous abrasive mesh tube wherein the continuous mesh tube wraps around the surfaces of the continuous absorbent element;
   b) feeding the continuous mesh tube with the continuous absorbent element into a compressing and ultra-sonic sealing apparatus wherein the compressing and ultra-sonic sealing apparatus has a compressing apparatus and a ultra-sonic sealing apparatus;
   c) compressing the continuous mesh tube and the continuous absorbent element within the continuous mesh together;
   d) sealing the compressed continuous mesh tube along with the compressed continuous absorbent element with the ultra-sonic sealing apparatus;
   e) cutting the compressed and sealed continuous mesh tube and the compressed continuous absorbent element thereby forming one or more cleaning pads and;
   f) cooling the compressing and ultra-sonic sealing apparatus during the steps of compressing, sealing and cutting.

2. A method of making cleaning pads of claim 1 wherein the step of inserting the continues absorbent element into the continuous abrasive mesh tube further comprises of a step of holding an end of the continues absorbent element and a step of pulling the length of the continues absorbent element through the continuous abrasive mesh tube.

3. A method of making cleaning pads of claim 2 wherein the step of compressing and the step of sealing is done simultaneously.

4. A method of making cleaning pads of claim 3 further comprising a step of ejecting the cleaning pads after the step of cutting.

5. A method of making cleaning pads of claim 4 further comprising a step of sensing the movement of the continuous mesh tube with the continuos absorbent element into the compressing and ultra-sonic sealing apparatus for a predetermined distance.

6. A method of making cleaning pads of claim 4 wherein the ultra-sonic sealing apparatus uses a predetermined ultra-sonic wave frequency of less than about 25 kilo-hertz.

7. A method of making cleaning pads of claim 6 wherein the ultra-sonic sealing apparatus uses a predetermined ultra-sonic wave frequency between about 10 kilo-hertz and about 21 kilo-hertz.

8. A method of making cleaning pads of claim 7 wherein the ultra-sonic sealing apparatus uses a predetermined ultra-sonic wave frequency is about 20 kilo-hertz.

9. A method of making cleaning pads of claim 7 wherein the ultra-sonic sealing apparatus uses a predetermined ultra-sonic wave frequency is about 15 kilo-hertz.

10. A method of making cleaning pads of claim 7 wherein the step of feeding the continuous mesh feeds more than one continuous mesh tubes simultaneously.

11. A cleaning pad produced in accordance with the method defined in claim 1.

12. A cleaning pad produced in accordance with the method defined in claim 7.

13. A method of making cleaning pads comprising the steps of:
   a) knitting a continuous abrasive mesh tube;
   b) inserting a continuous absorbent element with a plurality of surfaces into the continuous abrasive mesh tube wherein the continuous mesh tube wraps around the surfaces of the continuous absorbent element;
   c) feeding the continuous mesh tube with the continuous absorbent element into a compressing and ultra-sonic sealing apparatus;
   d) compressing the continuous mesh tube and the continuous absorbent element within the continuous mesh together;
   e) sealing the compressed continuous mesh tube along with the compressed continuous absorbent element with the ultra-sonic sealing apparatus;
   f) cutting the compressed and sealed continuous mesh tube and the compressed continuous absorbent element thereby forming one or more cleaning pads and;
   g) cooling the compressing and ultra-sonic sealing apparatus during the steps of compressing, sealing and cutting.

14. A method of making cleaning pads of claim 13 wherein the step of inserting the continues absorbent element into the continuous abrasive mesh tube further comprises of a step of holding an end of the continues absorbent element and a step of pulling the length of the continues absorbent element through the continuous abrasive mesh tube.

15. A method of making cleaning pads of claim 14 further comprises
   a) a step of ejecting the cleaning pads after the step of cutting; and
   b) a step of sensing the movement of the continuous mesh tube with the continuos absorbent element into the compressing and ultra-sonic sealing apparatus for a predetermined distance.

16. A method of making cleaning pads of claim 15 wherein the ultra-sonic sealing apparatus uses a predetermined ultra-sonic wave frequency between about 10 kilo-hertz and about 21 kilo-hertz.

17. A method of making cleaning pads of claim 16 wherein the ultra-sonic wave sealing apparatus uses a predetermined ultra-sonic wave of about 20 kilo-hertz or about 15 kilohertz.

18. A cleaning pad produced in accordance with the method defined in claim 13.

19. A cleaning pad produced in accordance with the method defined in claim 17.

* * * * *